United States Patent
Nyström et al.

(10) Patent No.: US 6,705,016 B2
(45) Date of Patent: Mar. 16, 2004

(54) DEVICE FOR ALTERNATING THE CUTTING HEIGHT FOR A TRIMMER

(75) Inventors: Marcus Nyström, Norrahammar (SE); Ricky Sundqvist, Granna (SE)

(73) Assignee: Aktiebolaget Electrolux, Stockholm (SE)

( * ) Notice: Subject to any disclaimer, the term of this patent is extended or adjusted under 35 U.S.C. 154(b) by 0 days.

(21) Appl. No.: 10/458,997

(22) Filed: Jun. 11, 2003

(65) Prior Publication Data

US 2003/0229994 A1 Dec. 18, 2003

(30) Foreign Application Priority Data

Jun. 13, 2002 (SE) ................................. 0201819

(51) Int. Cl.[7] ............................................. A01D 34/68
(52) U.S. Cl. ............................. 30/347; 30/276; 56/12.7
(58) Field of Search ..................... 30/276, 347; 56/12.7, 56/295

(56) References Cited

U.S. PATENT DOCUMENTS

| | | | |
|---|---|---|---|
| 4,282,653 A | | 8/1981 | Comer et al. |
| 4,905,465 A | | 3/1990 | Jones et al. |
| 4,962,630 A | * | 10/1990 | Jones ........................... 56/12.7 |
| 5,313,770 A | * | 5/1994 | Smothers .................... 56/12.7 |
| 5,493,785 A | * | 2/1996 | Lawrence ..................... 30/347 |
| 5,615,543 A | * | 4/1997 | Caffey et al. ................. 56/295 |
| 5,906,051 A | | 5/1999 | Nannen |
| 6,032,442 A | * | 3/2000 | Paolo .......................... 56/12.7 |
| 6,052,974 A | | 4/2000 | Harb |
| 6,158,129 A | * | 12/2000 | Klein ........................... 30/276 |
| 6,363,616 B1 | * | 4/2002 | Kreissle ....................... 30/347 |

* cited by examiner

Primary Examiner—Douglas D. Watts
(74) Attorney, Agent, or Firm—Pearne & Gordon LLP

(57) ABSTRACT

Trimmer head (10; 20) comprising at least two sections (11, 12; 21, 22) that creates a casing surrounding one or more bobbins and related cutting filaments. The cutting filament or filaments are lead through the casing via openings (17) placed at different heights in the casing so that the cutting height is adjustable. In order to facilitate loading of cutting filament so that the selected cutting height is achieved is a groove (18) extending from the edge of the section of the trimmer head that is provided with openings to the openings. The operator uses the groove (18) for placing the cutting filament into the selected opening (17).

8 Claims, 2 Drawing Sheets

DEVICE FOR ALTERNATING THE CUTTING HEIGHT FOR A TRIMMER

A frequently used tool for cutting grass and low vegetation is different types of trimmers. These tools are suitable for cutting in areas where it is difficult for lawn movers and larger machines to maneuver because of for example a varying countryside and threes or similar acting as obstacles. Also the edges of the lawns or areas adjacent to flowerbeds, plantings, fences or other obstacles are areas where a trimmer is the preferred tool.

Different areas however have different needs for cutting height. The cutting height is mostly connected to the areas where the tools are used. For example is grass and growth in some areas preferably cut short while other areas might have growth with a sensitive lower part that would get damaged if cut as short as the grass.

There is also en esthetical aspect that makes it desirable to alternate the cutting height of the trimmer and make it easy for the operator to keep a constant cutting height of the vegetation in an area.

In U.S. Pat. No. 6,052,974 is a solution that makes it possible to alternate the cutting height disclosed. The cutting filament is attached to a disc placed on a cylinder that extends through the disc. The disk is movable both upwards and downwards along the cylinder when the screw that keeps the disk in the selected position is eased. This solution, however, has the drawback that it is complicated to change the selected cutting height.

Another solution that makes it possible to alternate the cutting height of a trimmer is disclosed in U.S. Pat. No. 5,906,051. The cutting filament is stored on a bobbin inside a casing. The casing is attached to a treaded shaft. The casing is movable along the shaft by rotating the casing. Also this solution is complicated, and consequently expensive to manufacture.

It is therefore desirably to find a solution that makes it easy for the operator to adjust the cutting height over the ground and also is simple and cheep to manufacture.

In this application is a solution to the problems defined above presented. The new solution comprises a trimmer head with a casing divided into two sections. The casing surrounds a bobbin where the cutting filament is stored. One section of the casing is secured to a drive shaft while the other section is releasable so that it is possible to open the casing and replace the bobbin when the cutting filament is consumed. Someone of the two sections is provided with openings called eyelets where one end of the cutting filament exits the trimmer head casing. The eyelet is provided with a number of openings placed at different heights on the trimmer head so that it is possible to adjust the cutting height. In order to simplify the loading of new cutting filament and the adjustments in cutting height is a groove extending from the edge of the trimmer head section provided with the eyelet to the different openings for the cutting filament. The section of the trimmer head casing that not is provided with the eyelets is instead comprising a protruding part placed and shaped so that it will close the groove and keep the cutting filament in the selected opening when the two sections of the trimmer head casing are put together. The protruding part could also be a separate component that is placed in the groove before the two sections are put together.

This solution makes it considerably easier to load a new bobbin and cutting filament as well as adjusting the cutting height since the adjustment is done by changing to another opening in the eyelet in the casing that surrounds the bobbin where the cutting filament is stored instead of, like in known solutions, moving the entire section that the cutting filament is attached to.

Also loading of new cutting filament is fast and simple for the operator since the bobbin with one or more cutting filament is placed in the trimmer head and the cutting filament lead through the groove and placed in the opening that provides the selected cutting height over the ground. The cutting filament or cutting filaments does thereby not have to be put trough some opening or small passages in the casing surrounding the bobbin in order to set up the trimmer head which facilitates for the operator.

The trimmer head is illustrated in the figures.

FIG. 1. Illustrates one embodiment of the trimmer head casing

FIG. 2. Illustrates a second embodiment of the trimmer head casing

Figure 1:
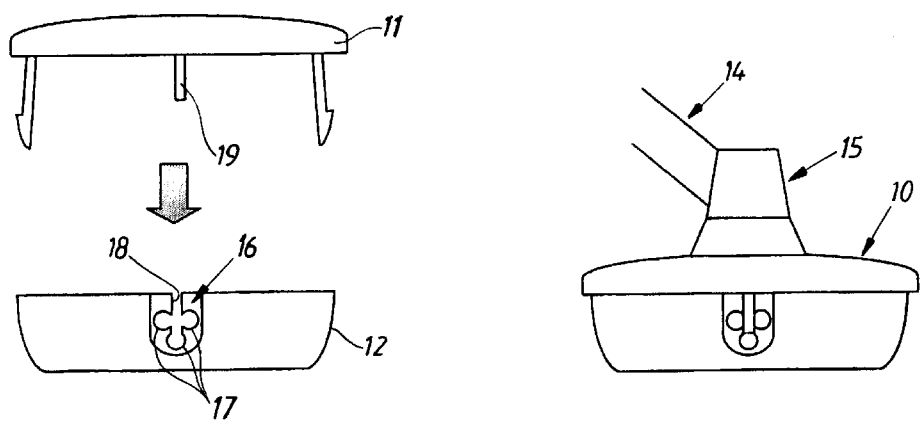

In FIG. 1 is a trimmer head 10 that is attached to one end a tube 14 via a fastening device 15 illustrated. The trimmer head 10 comprises two sections that surrounds at least one not illustrated bobbin for storing of cutting filament. The two sections is a top section 11 and a cup shaped section 12. The cup shaped section 12 is designed so that the two sections surround the not illustrated bobbin or bobbins. The cup shaped section 12 is provided with one or more plates 16 placed around the circumference of the cup shaped section 12. In the plate 16 are openings 17 placed at different heights so that it is possible to adjust the cutting height of the trimmer. The plates 16 are preferably placed in recesses in the cup shaped section 12 so that they are replaced easily if damaged or another type of plate 16 and openings are requested. For a not illustrated cutting filament placed so that the cutting filament is lead from the bobbin and out from the trimmer head 10. The top section 11 and the cup shaped section 12 is normally made of a plastic material while the plates 16 either are made of a plastic material resistant to wear or a metal so that the openings 17 stands the wear from the cutting filament.

In order to facilitate the loading of cutting filament for the operator is a groove 18 extending from the openings 17 to the edge of the plate 16 so that the cutting filament is lead to the opening 17 that equals the selected cutting height. When the cutting filament is in the right opening 17 is the trimmer head 10 put together and a protruding part 19 on the top section 11 placed in the groove 18 so that the cutting filament is kept in the selected opening 17. The top section 11 is provided with the same number of protruding parts 19 as the number of plates 16 in the cup shaped section 12 and placed so that the will fit in the different grooves 18. The protruding parts 19 and the grooves 18 are preferably shaped so that the protruding parts 19 are kept in the right position in the grooves 18.

The top section 11 is also provided with locking means 25 that secures the different sections of the trimmer head 10.

The protruding parts 19 could also be separate components and not attached to the top section 11 of the trimmer head 10. The protruding parts 19 are then put in the grooves 18 before the different sections are put together.

Figure 2:
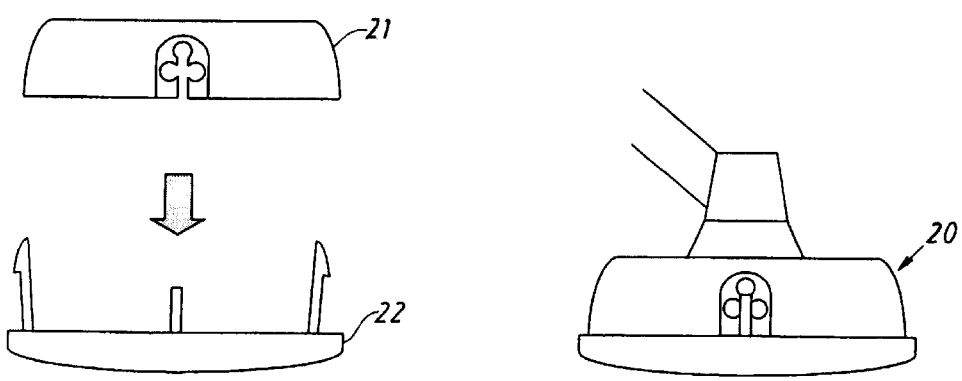

In FIG. 2 is a second embodiment of a trimmer head 20 illustrated. The two sections that the trimmer head casing is comprising has been modified so that the top section of the trimmer head 20 is a cup shaped top section 21 designed to enclose an not illustrated bobbin. The bobbin is kept in the cup shaped top section 21 by a bottom plate 22 that in combination with the cup shaped top section 21 creates the trimmer head 20. The same solution including plates, openings and grooves sealed by a protruding section is used in this trimmer head. The plate or plates with openings for the cutting filament is placed in the cup shaped top section 21 while the protruding parts either are separate components or secured to the bottom plate 22.

Figure 3A:
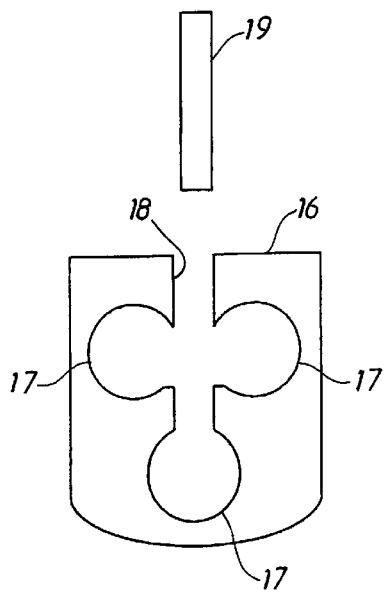
FIGS. 3a, 3b Illustrates the openings for the cutting filament and the protruding part that keeps the cutting filament in the selected opening.
Figure 3B:
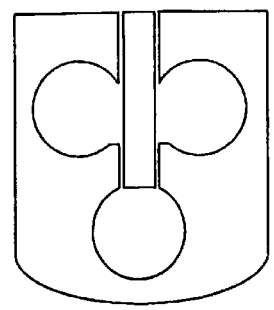

FIGS. 3a and 3b illustrates an embodiment of the plate or plates 16. In FIG. 3a is the groove 18 to the openings 17 not sealed by the protruding part 19 and consequently ready for loading of a cutting filament. When the cutting filament is placed in the selected opening 17 is the protruding part 19 placed in the groove 18 so that the cutting filament is kept in the selected opening 17. This is illustrated in FIG. 3b.

The plate 16 illustrated in FIGS. 3a and 3b is provided with two openings 17 placed at the same height. The two openings are needed to make it possible for the trimmer head to rotate in two directions since the cutting filament must align the inside surface of the opening 17 towards the plate 16 instead of the protruding part 19.

Figure 4:
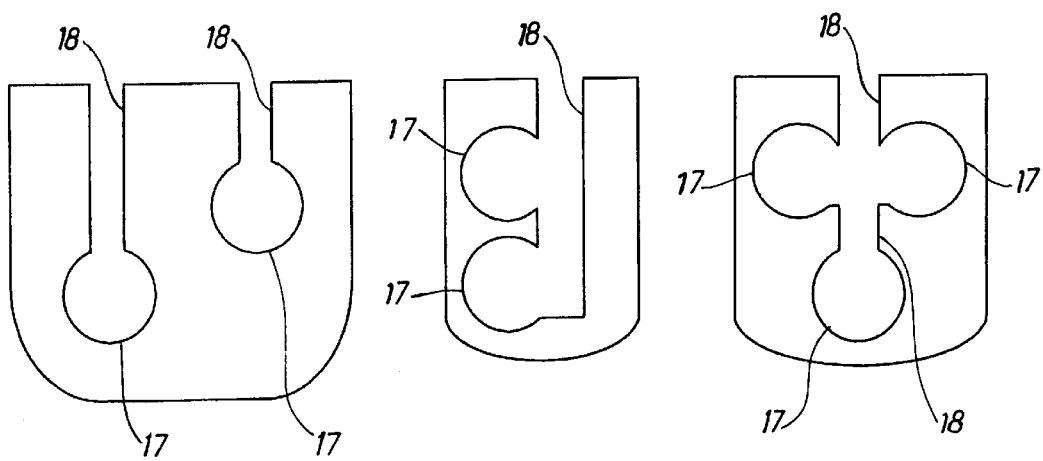
FIG. 4 Illustrates a number of different embodiments of the openings for the cutting filament.

FIG. 4 illustrates different embodiments of the plates 16 provided with openings 17 and grooves 18. The same solution is however used for all different plates since a groove is extending between the openings 17 and the edge of the plate 16.

What is claimed:

1. A trimmer head comprising:

a casing surrounding a bobbin having a cutting filament, the casing comprising a first section removably connectable to a second section;

a plurality of openings each located at a different height in the first section of the casing; and a groove extending between an edge of the first section of the casing and at least one of the plurality of openings, wherein the cutting filament is selectively fed through one of the plurality of openings in order to selectively adjust the cutting height of the trimmer head.

2. The trimmer head according to claim 1, wherein all openings in the casing for the cutting filament are located in the first section of the casing.

3. The trimmer head according to claim 1 or 2, further comprising a second bobbin having a second cutting filament and wherein there are at least two of the plurality of openings for each of the cutting filament and the second cutting filament.

4. The trimmer head according to claim 1, further comprising a protruding part extending into the groove for keeping the cutting filament in a selected opening.

5. The trimmer head according to claim 4, wherein the protruding part extends from the second section of the casing so that the protruding part extends into the groove when the first section is connected to the second section.

6. The trimmer head according to claim 4, wherein the protruding part is a separate component that is inserted into the groove before the first section and the second section are connected, the protruding part being locked into position after the first section and second section are connected.

7. The trimmer head according to any one of claims 4–6, wherein a passage between one of the plurality of openings and the groove is positioned such that the cutting filament does not contact the protruding part when the trimmer head is rotating in one direction.

8. Trimmer head according to any one of claims 1, 2 or 4–6, wherein the openings are located in a removable and replaceable plate attached to the first section of the trimmer head.

* * * * *

UNITED STATES PATENT AND TRADEMARK OFFICE
CERTIFICATE OF CORRECTION

PATENT NO. : 6,705,016 B2
DATED : March 16, 2004
INVENTOR(S) : Marcus Nyström et al.

It is certified that error appears in the above-identified patent and that said Letters Patent is hereby corrected as shown below:

Column 1,
Line 6, please delete "movers", and insert therefor -- mowers --.
Line 8, please delete "threes", and insert therefor -- trees --.
Line 33, please delete "treaded", and insert therefor -- threaded --.
Line 27, please delete "desirably", and insert therefor -- desirable --.
Line 41, please delete "presented".

Column 2,
Line 7, please delete "trough", and insert therefor -- through --.

Signed and Sealed this

Thirty-first Day of August, 2004

JON W. DUDAS
*Director of the United States Patent and Trademark Office*